No. 854,521. PATENTED MAY 21, 1907.
R. H. NEFF.
COMPUTING CHEESE CUTTER.
APPLICATION FILED OCT. 22, 1906.
2 SHEETS—SHEET 1.
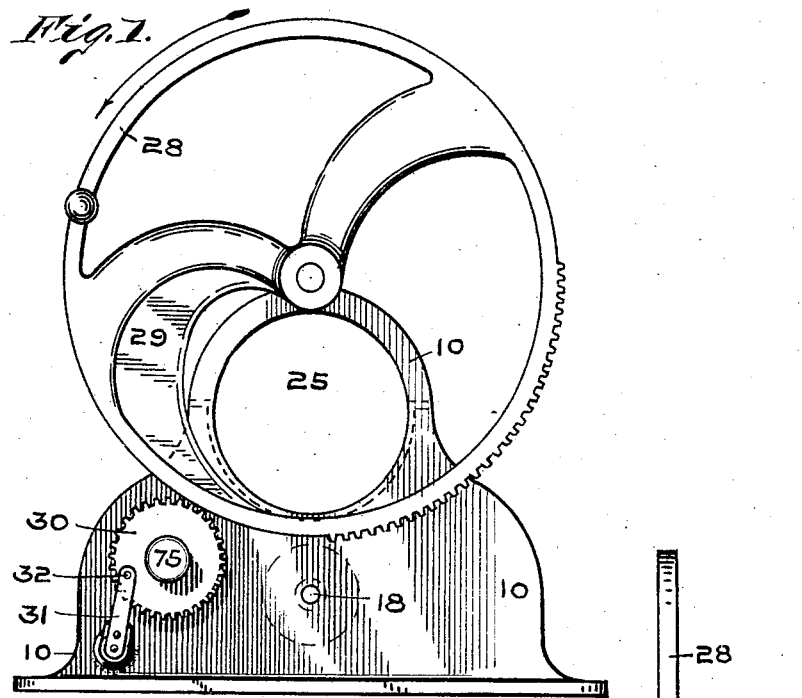
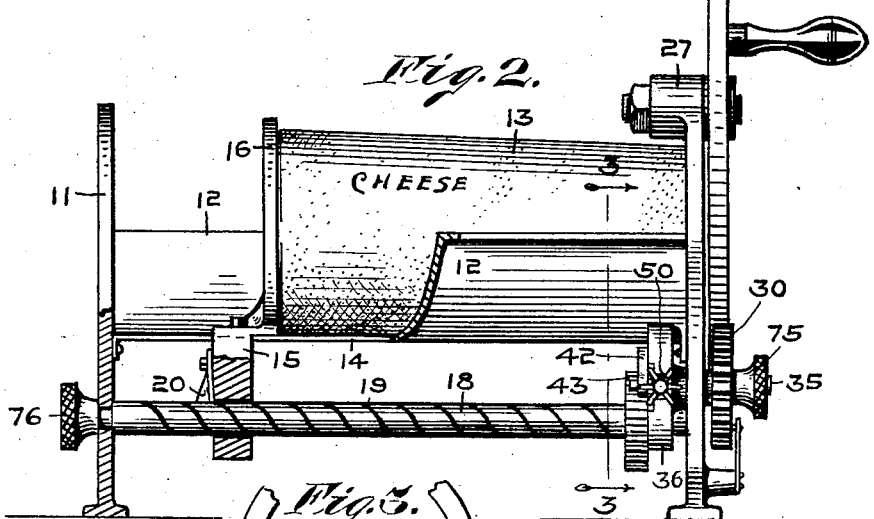
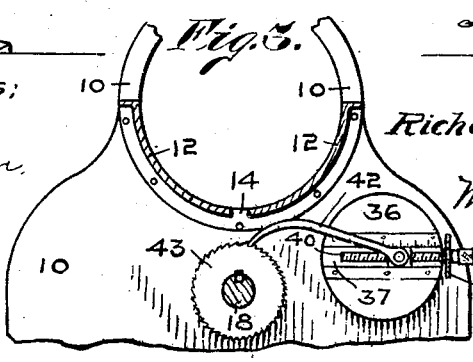
WITNESSES:
L. B. Woerner
J. C. Dynes
INVENTOR:
Richard H. Neff,
By
Minturn & Woerner,
Attorneys.

No. 854,521. PATENTED MAY 21, 1907.
R. H. NEFF.
COMPUTING CHEESE CUTTER.
APPLICATION FILED OCT. 22, 1906.
2 SHEETS—SHEET 2.
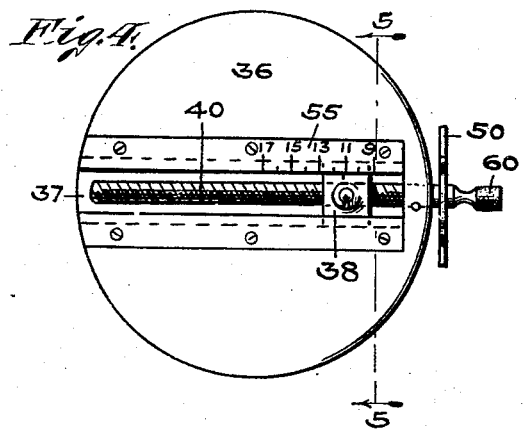
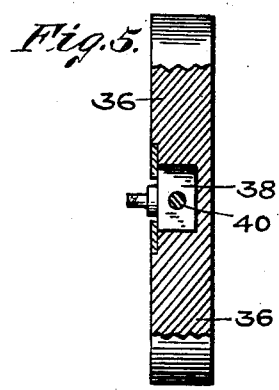
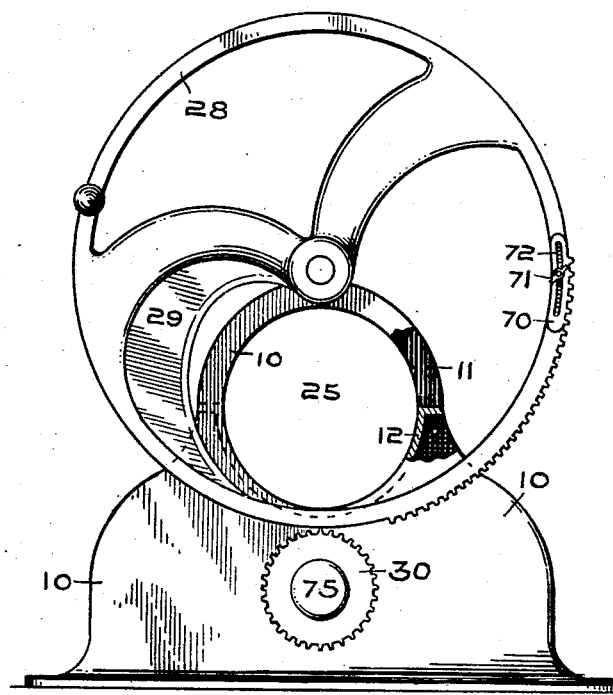
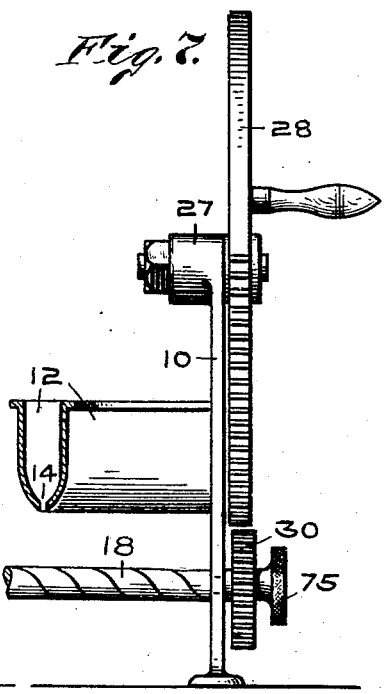
WITNESSES:
L. B. Woerner.
F. C. Dynes.
INVENTOR
Richard H. Neff,
By Minturn & Woerner
ATTY'S.

UNITED STATES PATENT OFFICE.

RICHARD H. NEFF, OF INDIANAPOLIS, INDIANA.

COMPUTING CHEESE-CUTTER.

No. 854,521.      Specification of Letters Patent.      Patented May 21, 1907.

Application filed October 22, 1906. Serial No. 339,974.

*To all whom it may concern:*

Be it known that I, RICHARD H. NEFF, a citizen of the United States, residing at Indianapolis, in the county of Marion and State of Indiana, have invented certain new and useful Improvements in Computing Cheese-Cutters, of which the following is a specification.

This invention relates to a computing cheese cutter and is particularly adapted to cut or slice that variety known to the trade as the long horn cheese; and the object of this invention is to enable a cheese of this character to be sliced so that the slices will be of uniform weight.

The objects of the invention are accomplished by the mechanism illustrated in the accompanying drawings, in which Figure 1 is a front elevation of a computing cheese cutter embodying the several features of my invention. Fig. 2 is a view partly in side elevation and partly in section of the construction shown in Fig. 1. Fig. 3 is a fragmentary detail view on the dotted line 3—3 in Fig. 2. Fig. 4 is a side elevation of the computing disk-wheel. Fig. 5 is a section on the dotted line 5—5 in Fig. 4. Fig. 6 is a front elevation of my cheese cutter embodying a modified construction, and Fig. 7 is a side elevation of the front end of the construction shown in Fig. 6.

The machine consists of a front and rear plate 10 and 11 which form a support for the mechanism and between which a semi-circular trough 12 is mounted into which the cheese 13 is placed. The trough 12 is made in two sections with a longitudinal slot 14 in the lower and central portion through which the tail-piece 15 of the follower 16 extends. Mounted in the frame 10 and 11 immediately below the longitudinal slot 14 in the trough 12 is a shaft 18 provided with the spiral thread 19 which is engaged by a plate 20 secured to the tail-piece 15, so that when said shaft 18 is rotated in the proper direction the follower 16 will move the cheese toward the cutter-knife. The trough 12 registers with a circular opening 25 in the frame portion 10 through which the cheese is moved. The frame 10 is provided with a box 27 which forms a bearing for a hand-wheel 28 to which the cutter-knife 29 is secured, and when said hand-wheel is revolved in the direction indicated by the arrow in Fig. 1 a slice will be cut off from the cheese. The hand-wheel 28 is provided on its periphery with a series of teeth which engage a pinion 30 at each revolution thereof, and the number of teeth on said wheel are sufficient to impart a complete rotation to said pinion 30. A yieldable spring 31, carrying a pin 32, secured to the frame 10 is so mounted in relation with the pinion 30 that the pin will ride upon the surface of said pinion. The pinion is provided on its face with a slight depression which lies in the path of the pin 32, so that when said pinion is operated the pin will be moved out of said depression and will ride on the face of said pinion until the depression again registers therewith. The two thus determine the complete revolution of said pinion and lock it. The teeth on the hand-wheel 28 and the pinion 30 are so arranged that as the last tooth on the hand-wheel passes out of the pinion 30, the depression in the face of the latter will engage the pin 32.

The pinion 30 is mounted on a shaft 35 which extends through the frame 10 and carries a grooved disk-wheel 36 on its other end. The grooved wheel 36 is practically a slotted cross-head provided with a slot 37 in which a sliding box 38 moves. The box 38 forms a bearing for a pawl 42 which extends over and engages a ratchet-wheel 43 securely keyed to the screw-shaft 18. When the hand-wheel 28 is given a complete rotation the pinion 30 will be operated, and by means of the eccentric mounting of the pawl 42 movement will be imparted to the screw-shaft 18, which, through the tail-piece 15 and the follower 16, causes the cheese to move toward the cutter-knife 29. The cheese, however, cannot uniformly be moved toward the cutter-knife so as to insure slices of uniform thickness without causing a variation in their weight, on account of the peculiar condition surrounding both the character of the cheese and the custom for marketing same.

The long horn cheese is made into uniform size, but it is not of uniform diameter throughout its length, since it tapers slightly from the base to the top to enable it to be more readily withdrawn from the mold. Thus it will be seen that, to secure slices of uniform weight, the slices must vary in thickness. Then too, one cheese may weigh less than another on account of its porous condition which is a feature distinctively characteristic of the cheese making industry and cannot be overcome without injury to the cheese. Under these conditions, a grocerman buying the two at a fixed price per pound would pay more for one cheese than for the other, so that before a machine of the character here described would appeal to him, it must be capable of cutting the heavier cheese into more slices to insure him his uniform profit. The customer loses nothing, for while a slice may be thinner from a more dense cheese it has the prescribed weight.

The machine is arranged to take care of these difficulties so that the first slice from the small end of the cheese will be the thickest, while each subsequent slice will grow thinner on account of the increasing diameter of the cheese, until the last slice which will be the thinnest but which will have the greatest diameter. The mechanism to vary the movement to graduate the slicing of the cheese will now be described. In order to vary the thickness of the slices as they are cut from the cheese, I must vary the stroke of the pawl 42 which in turn will make a change in the movement of the screw-shaft 18, so that the movement of the cheese toward the cutter-knife is also varied. To enable me to change the stroke of the pawl 42 I slidably mount the box 38 in the disk-wheel 36, and by passing a screw-shaft 40 through the side of said wheel and said box the latter will be moved along the slot 37 when the former is rotated. The shaft and box are automatically moved at each rotation of the disk-wheel 36 by providing the screw-shaft 40 with a star-wheel 50. At each rotation of the disk-wheel 36 the star-wheel is carried around therewith, and the relation of the star-wheel and the pawl 42 is such that as the two pass one another one of the prongs on the star-wheel will engage the pawl, thus causing a partial rotation of the shaft 40. This operation of the shaft 40 causes a slight movement of the box 38, which in turn will change the stroke of the pawl on the next rotation of the disk-wheel 36. A shortened stroke of the pawl 42 causes a reduced movement of both the screw-shaft 18 and the travel of the cheese toward the cutter knife so that each slice of cheese will be thinner than the preceding one. The parts are so timed that the throw of the box 38 will compensate for the increase in diameter of the cheese, so that as each slice of cheese will vary in thickness from the succeeding slice they will, however, be of uniform weight. The disk-wheel 36 is provided with a graduating scale 55, the numbers of which will correspond to the weight of the cheese in the machine so that the box 38 may be so set in relation to said graduating scale that the cheese may be properly sliced from the beginning. The screw-shaft 40 is provided with a milled-head 60 which may be grasped by the hand to readily bring the box 38 to the desired place on the graduating scale.

The pinion 30 is provided with a milled-head 75 so that the screw-shaft 18 can be rotated independently of the hand-wheel to move the cheese toward the cutter-knife. As each rotation of the hand-wheel will cut a 5 cent slice of cheese, it becomes possible to advance the cheese sufficiently forward by means of the head 75 to enable one to cut a single slice of greater proportions worth 10, 15 or 20, cents, as may be desired.

In Figs. 6 and 7 of the drawings I have shown a modified construction of my computing cheese cutter in which a long horn cheese of uniform diameter, should they so make them, can be sliced. With a cheese so molded the machine may be considerably simplified by placing the pinion 30 directly upon the screw-shaft 18. When the cheese is so formed there remains only one question and that is of weight, as some of them will still be more dense than others. In order that a cheese which is more porous and thus lighter, may be cut into thicker slices, a slight additional throw must be imparted to the screw-shaft 18 so that the cheese will be more readily advanced toward the cutter-knife. To accomplish this end the number of teeth on the hand-wheel must be increased, which is secured by providing a toothed plate 70 to the hand-wheel 28 by means of a wing-nut 71. The plate 70 has teeth on its outer edge which are of a size to correspond with the remaining teeth on said wheel, and when not in use lie in the same plane. The said plate is provided with a longitudinal slot 72 so that when I desire to increase the number of teeth on said wheel to insure a further throw of the pinion 30, I loosen the wing-nut 71 and move said plate forward a distance to insure the additional number of teeth desired. Only a few new additional teeth are necessary, and they may be kept in perfect alinement with the fixed teeth on the hand-wheel by letting the rear tooth on the plate register with the fixed teeth. In this device the screw-shaft 18 may be moved by the hand to cut a single slice of greater value by rotating the pinion 30 by means of the head 75, as heretofore described.

The screw-shaft 18 is provided at one end with a head 76 by which the shaft may be manipulated to speedily withdraw the follower 16 from the cutter-knife, to admit a new cheese to be placed into the machine.

Having thus fully described my said invention, what I desire to secure by Letters Patent, is—

1. In a computing cheese cutter, a cheese holding bed-plate for directing the cheese toward the cutter-knife, a follower arranged within the bed-plate for advancing the cheese toward the cutter-knife, a screw-shaft for moving said follower, a hand-wheel mounted transversely of the path in which the cheese travels, a cutter-knife secured to said wheel, gear teeth on said hand-wheel, a pinion arranged to engage the teeth on the hand-wheel, and means operated by said pinion to engage and operate the screw-shaft.

2. In a computing cheese cutter, a cheese holding bed-plate for directing the cheese toward the cutter-knife, a follower arranged within the bed-plate for advancing the cheese toward the cutter-knife, a screw-shaft for moving said follower, a hand-wheel mounted transversely of the path in which the cheese travels, a cutter-knife secured to said wheel, gear teeth on the hand-wheel, a pinion arranged to engage the teeth on the hand-wheel, means operated by said pinion to engage and operate the screw-shaft, and means for manipulating said screw-shaft independently of said hand-wheel.

3. In a computing cheese cutter, a cheese holding bed-plate for directing the cheese toward the cutter-knife, a follower arranged within said bed-plate for advancing the cheese toward the cutter-knife, a screw-shaft for moving the follower, a hand-wheel mounted transversely of the path in which the cheese travels, a cutter-knife secured to said wheel, gear teeth on said hand-wheel, a pinion arranged to engage the teeth on the hand-wheel, means for determining a complete rotation of said pinion, a slotted cross-head operated by said pinion, and means extending from said cross-head to engage and operate the screw-shaft.

4. In a computing cheese cutter, a cheese holding bed-plate for directing the cheese toward the cutter-knife, a cheese advancing means for moving the cheese toward the cutter-knife, a screw-shaft for moving the cheese advancing means, a hand-wheel mounted transversely of the path in which the cheese travels, a cutter-knife secured to said wheel, a slotted cross-head operated by said hand-wheel, a pawl slidably secured on said cross-head and adapted to actuate said screw-shaft, and means carried by said cross-head to shift the position and vary the stroke of said pawl.

5. In a computing cheese cutter, a cheese holding bed-plate for directing the cheese toward the cutter-knife, a follower arranged within said bed-plate for advancing the cheese toward the cutter-knife, a screw-shaft mounted parallel with the bed-plate and adapted to impart movement to said follower, a hand-wheel mounted transversely of the path in which the cheese travels, a cutter-knife secured to said wheel, a pinion operated by said hand-wheel, a cross-head operated by said pinion, a pawl slidably mounted in said cross-head and adapted to engage and operate the screw-shaft, and means on said slotted cross-head to vary the stroke of said pawl.

6. In a computing cheese cutter, a cheese holding bed-plate for directing the cheese toward the cutter-knife, a follower arranged within said bed-plate for advancing the cheese toward the cutter-knife, a screw-shaft mounted parallel with the bed-plate and adapted to impart movement to said follower, a hand-wheel mounted transversely of the path in which the cheese travels, a cutter-knife secured to said wheel, a pinion operated by said hand-wheel, a cross-head operated by said pinion, a box slidably mounted in said cross-head, a pawl pivotally secured to said sliding box and adapted to engage and operate the screw-shaft, a threaded shaft in the cross-head that engages the sliding box for changing the position of said box and pawl, and means to automatically and intermittently move said threaded shaft.

In witness whereof, I, have hereunto set my hand and seal at Indianapolis, Indiana, this, 8th day of October, A. D. one thousand nine hundred and six.

RICHARD H. NEFF. [L. S.]

Witnesses:
F. W. WOERNER,
L. B. WOERNER.